(12) United States Patent
Lo

(10) Patent No.: US 11,804,154 B2
(45) Date of Patent: Oct. 31, 2023

(54) SMART INTERACTIVE DISPLAY DEVICE, SMART INTERACTIVE DISPLAY SYSTEM, AND INTERACTIVE DISPLAY METHOD THEREOF

(71) Applicant: AMTRAN TECHNOLOGY CO., LTD., New Taipei (TW)

(72) Inventor: Kuo Chih Lo, New Taipei (TW)

(73) Assignee: AmTRAN Technology Co., Ltd., New Taipei (TW)

(*) Notice: Subject to any disclaimer, the term of this patent is extended or adjusted under 35 U.S.C. 154(b) by 131 days.

(21) Appl. No.: 17/183,801

(22) Filed: Feb. 24, 2021

(65) Prior Publication Data

US 2021/0264827 A1    Aug. 26, 2021

(30) Foreign Application Priority Data

Feb. 25, 2020 (TW) .................................. 109105974

(51) Int. Cl.
*G06F 3/147* (2006.01)
*G09F 27/00* (2006.01)
*G06F 3/16* (2006.01)
*G06N 20/00* (2019.01)
*G06V 40/10* (2022.01)

(52) U.S. Cl.
CPC ............ *G09F 27/005* (2013.01); *G06F 3/167* (2013.01); *G06N 20/00* (2019.01); *G06V 40/103* (2022.01); *G06V 2201/07* (2022.01)

(58) Field of Classification Search
CPC ... G07F 17/3206; G07F 17/3227; G07C 9/00; G07C 9/253; G09F 27/00; G06Q 30/0643; G06Q 30/02; G06F 1/3231
See application file for complete search history.

(56) References Cited

U.S. PATENT DOCUMENTS

| | | | | |
|---|---|---|---|---|
| 9,911,398 | B1* | 3/2018 | McQueen | G06F 3/0481 |
| 2004/0249837 | A1* | 12/2004 | Yagi | A63F 13/798 |
| 2009/0209326 | A1* | 8/2009 | Okada | G07F 17/3206 |
| | | | | 463/43 |
| 2013/0337889 | A1* | 12/2013 | Gagner | G07F 17/323 |
| | | | | 463/36 |
| 2014/0323193 | A1* | 10/2014 | Keilwert | G07F 17/3227 |
| | | | | 463/16 |
| 2020/0265301 | A1* | 8/2020 | Burger | G06N 3/084 |
| 2020/0351265 | A1* | 11/2020 | Srinath | H04N 7/152 |
| 2021/0134278 | A1* | 5/2021 | Iwase | G06N 7/005 |
| 2021/0192249 | A1* | 6/2021 | Hwang | G06V 40/67 |

* cited by examiner

*Primary Examiner* — Yuzhen Shen
(74) *Attorney, Agent, or Firm* — Rosenberg, Klein & Lee

(57) ABSTRACT

The present invention provides a smart interactive display device, a smart interactive display system, and an interactive display method thereof. The method comprises steps of: a sensing device sensing a body signal emitted by a human body, outputting a sensing signal correspondingly, and transmitting the sensing signal to a control unit; the control unit driving an image extraction unit to start according to the sensing signal for extracting an image and uploading the image to an artificial intelligence unit; the control unit obtaining a corresponding message corresponding to an analysis result produced by the artificial intelligence unit by analyzing the image; and the control unit outputting an assigned information content assigned by the corresponding message to the display device for playing. By enabling interaction with users, the smart interactive display system can be more friendly to users.

18 Claims, 10 Drawing Sheets

SMART INTERACTIVE DISPLAY DEVICE, SMART INTERACTIVE DISPLAY SYSTEM, AND INTERACTIVE DISPLAY METHOD THEREOF

FIELD OF THE INVENTION

The present invention relates generally to a smart interactive display device, a smart interactive display system, and an interactive display method thereof.

BACKGROUND OF THE INVENTION

The human-computer interaction (HCI) means the interactions between devices and users, wherein the devices can be various machines or computerized devices with software. Users can interact with and operate devices via HCI interface. The design of HCI enables users to comprehend the interface and achieving the purpose of operating machines more easily.

Currently, the HCI devices in public area are mostly public displays, which only routinely play fixed contents in schedule when no user is operating. In addition, the administrator of the public displays usually updates the played contents after several days, wherein the contents can be public messages such as normal product ads, movie trailers, weather of the date, or regional guides . . . etc., so the public displays lack of capability to play the contents adaptive to different users. Besides, the interactions between the users and the displays are mostly through the touch screens, which still require the users to operate manually. The user experience of such interactions might be degraded owing to external factors such as the touch sensitivity or the dusts on displays.

Due to the drawbacks in the usages, the structural designs, and the modular integrations of the prior art interactive display devices fall short of ideal, developing a user-friendly smart interactive display system and method for better user experience has become the major challenge for the developers in the field.

SUMMARY

An objective of the present invention is to provide a smart interactive display device, a smart interactive display system, and an interactive display method thereof, which can provide different interactive experiences according to the user's age, gender, and language in different occasions.

To achieve the above objective, the present invention provides a smart interactive display device, a smart interactive display system, and an interactive display method thereof. The method comprises steps of: a sensing unit sensing a human body, generating a corresponding sensing signal, and transmitting said corresponding sensing signal to a control unit; the control unit driving an image capturing unit to start capturing an image according to the corresponding sensing signal and uploading said image to an artificial intelligence unit via said control unit; the control unit obtaining a corresponding message corresponding to an analysis result produced by said artificial intelligence unit, wherein the artificial intelligence unit analyzes said image and generates analysis results; and the control unit obtaining an assigned information content identified in said corresponding message and transmit the assigned information content to a display device for playing, wherein the display device stores a geographical tag and operation scripts corresponding to the geographical tag, and a part of the operation scripts is selected according to said corresponding message.

According to an embodiment of the present invention, the artificial intelligence unit determines said assigned information content according to said analysis results, generates said corresponding message which identifies said assigned information content, and transmits said corresponding message to said control unit.

According to an embodiment of the present invention, the corresponding message includes the assigned information content.

According to an embodiment of the present invention, the control unit acquires the assigned information content according to the corresponding message and transmits the assigned information content to the display device for playing.

According to an embodiment of the present invention, the control unit driving a speaker to play a voice message in response to said corresponding sensing signal.

According to an embodiment of the present invention, the analysis results include an estimated age and an estimated gender.

According to another embodiment of the present invention, further comprises a step of an audio input unit receiving an audio input signal and the control unit uploading the audio input signal to the artificial intelligence unit.

According to another embodiment of the present invention, wherein said artificial intelligence unit analyzes said image and said audio input signal and generates analysis results, and wherein said analysis results include an estimated age, an estimated gender and a speaking language.

According to a further embodiment of the present invention, further comprises a step of a touch control unit receiving a touch control signal and transmitting said touch signal to said control unit, where said control unit generates an input message in response to said touch signal and uploads the input message to said artificial intelligence unit.

According to a further embodiment of the present invention, further comprising a step of: issuing the geographical tag to the display device, wherein the geographical tag is corresponding to a current location of the display device; and determining whether the operation scripts stored in the display device are corresponding to the geographical tag.

The present invention provides a smart interactive display device, which comprises a display unit and a control unit. The control unit is connected electrically to the display unit, wherein a geographical tag and operation scripts corresponding to the geographical tag are stored in said smart interactive display device wherein said control unit is connected electrically to a sensing unit and an image capturing unit, said sensing unit senses a body signal of a human body and outputs a corresponding sensing signal to said control unit, and said control unit drives said image capturing unit to capture an image of the human body in response to the corresponding sensing signal and uploads said image to an artificial intelligence unit, and wherein said control unit acquires a corresponding message from said artificial intelligence unit, said corresponding message is generated by said artificial intelligence unit according to analysis results of said image, said control unit outputs an assigned information content identified by said corresponding message to said display unit for playing, and a part of the operation scripts is selected according to said corresponding message.

According to an embodiment of the present invention, the display unit includes a touch control unit and a user interface associated with the touch control unit.

According to an embodiment of the present invention, the smart interactive display device further comprises a speaker and an audio input unit. The speaker is connected electrically to the control unit for playing a voice message. The audio input unit is connected electrically to the control unit for receiving an audio input signal.

According to an embodiment of the present invention, wherein said smart interactive display device receives the geographical tag corresponding to a current location of said smart interactive display device.

According to an embodiment of the present invention, wherein said smart interactive display device receives the operation scripts corresponding to the geographical tag.

The present invention provides a smart interactive display system, which comprises a sensing unit, a display device stores a geographical tag and operation scripts corresponding to the geographical tag, an image capturing unit, and a control unit. The control unit electrically connected to said sensing device, said display device, and said image capturing unit, wherein said sensing unit senses a body signal of a human body and outputs a corresponding sensing signal to said control unit, and said control unit drives said image capturing unit to capture an image of the human body in response to the corresponding sensing signal and uploads said image to an artificial intelligence unit, and wherein said control unit acquires a corresponding message from said artificial intelligence unit, said corresponding message is generated by said artificial intelligence unit according to analysis results of said image, said control unit outputs an assigned information content identified by said corresponding message to said display device for playing, and a part of the operation scripts is selected according to said corresponding message.

According to an embodiment of the present invention, wherein said display device includes a touch control unit and a user interface associated with the touch control unit.

According to an embodiment of the present invention, the smart interactive display system further comprises a speaker, connected electrically to said control unit for playing a voice message, and an audio input unit, connected electrically to said control unit for receiving an audio input signal.

According to an embodiment of the present invention, wherein the display device receives the geographical tag corresponding to a current location of the display device.

According to an embodiment of the present invention, wherein the display device receives the operation scripts corresponding to the geographical tag.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

The present invention provides a smart interactive display device, a smart interactive display system, and an interactive display method thereof. By utilizing a sensing device, an image capturing unit, an audio input unit, and a control unit as well as a remote artificial intelligence unit, the character of the current user, such as the age, gender, and speech language, can be determined. After the artificial intelligence unit calculates and analyzes the collected data of the current user to give an analysis result, the control unit can acquire a corresponding message and output the corresponding message to the display device for playing to the user in real time.

Figure 1:
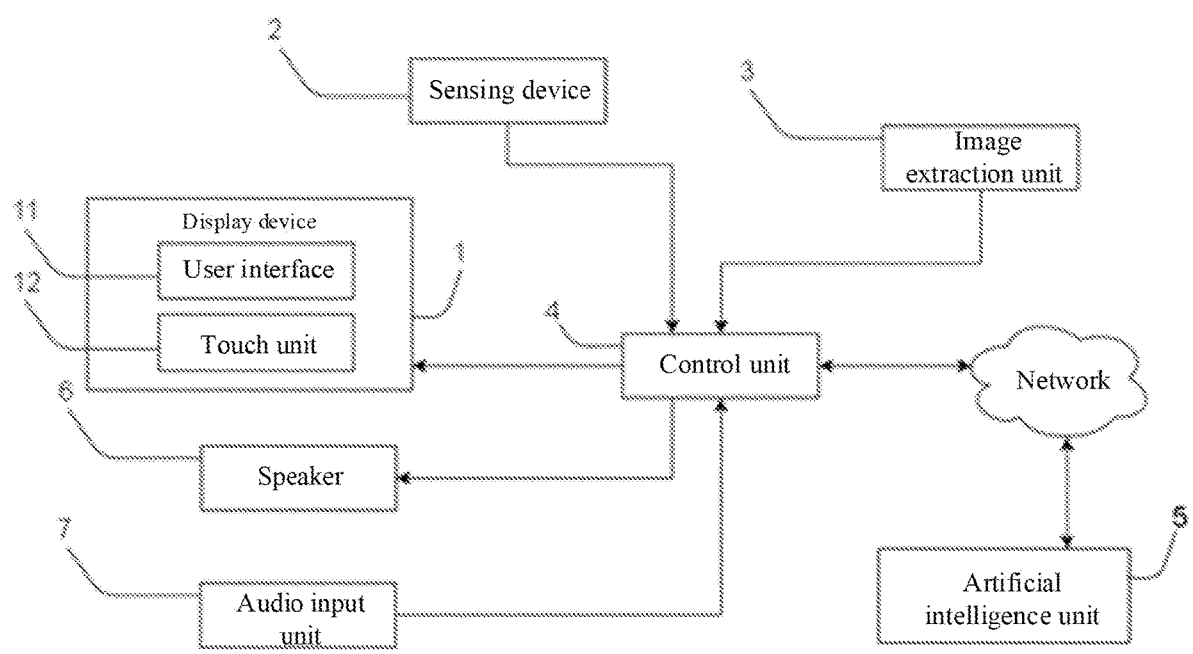
FIG. 1 shows a block diagram of the interactive display system according to an embodiment of the present invention.

First, please refer to FIG. 1, which illustrates a block diagram of the interactive display system according to an embodiment of the present invention. As shown in FIG. 1, the smart interactive display system according to the present invention comprises a display device 1, a sensing device 2, an image capturing unit 3, a control unit 4, and an artificial intelligence unit 5. In addition, the smart interactive display system according to the present invention can further comprise a speaker 6 and an audio input unit 7.

According to an embodiment of the present invention, the display device 1 of the smart interactive display system includes a user interface 11 and a touch control unit 12 and the display device 1 is connected to the control unit 4. The sensing device 2 is connected electrically to the control unit 4. The sensing device 2 can be, but not limited to, an ultrasonic sensor or an infrared sensor. Alternatively, the sensing device 2 can be a combination of multiple sensors. It is used for detecting proximity of the user or collecting user information. The image capturing unit 3 is connected electrically to the control unit 4 for capturing and outputting the image of the proximate user or other user information.

The control unit 4 can drive the image capturing unit 3 to start to capture user image according to the sensing signal of the sensing device 2. The artificial intelligence unit 5 is connected to the control unit 4 via the network. After receiving the captured image and performing calculations and analysis, the artificial intelligent unit 5 produces and transmits an analysis result to the control unit 4. The control unit 4 acquires a corresponding message correspondingly according to the analysis result and transmits the corresponding message to the display device 1. The artificial intelligence unit 5 includes a database 51 for storing the analysis result.

The display device 1 plays the content of the corresponding message to the user. The user can interact with the smart interactive display system in real time via the user interface 11 and the touch control unit 12. The user interface 11, the touch control unit 12, the image capturing unit 3 or other device can continuously sense the user message or receive the data input by the user. The user message or the input data is processed by the control unit before it is transmitted to the artificial intelligence unit 5, which then produces new analysis result to the control unit 4. The control unit 4 acquires the new corresponding message correspondingly according to the new analysis result. Hence, the interactive display system can interact with the user continuously. According to an embodiment of the present invention, the display device 1 also include a speaker 6 and the audio input unit 7 connected to the control unit 4 for playing the audio message to the proximate user or receiving the voice message from the proximate user and thus achieving the effect of interacting with the user.

According to an embodiment of the present invention, the control unit 4 processes and transmits the user message or the data input by the user to the artificial intelligence unit 5 which produces the analysis result. The artificial intelligence unit 5 can acquire the related information according to the analysis result, generate the corresponding message and return the corresponding message to the user. According to an embodiment of the present invention, after the artificial intelligence unit 5 produces the analysis result, it transmits the analysis result to a management device or a server managing the smart interactive display system. After acquiring the content of the corresponding message according to the analysis result, the management device or the server produces and provides the corresponding message to the control unit 4. Thereby, the control unit 4 can receive the corresponding message directly and make the display device 1 and the speaker 6 to play contents for the user.

According to an embodiment of the present invention, after the smart interactive display system is turned on, an initialization process of interaction operations will be executed. If a display device 1 is moved and set up at a new location, the smart interactive display system issues a new geographical tag corresponding to the new location to the display device 1. According to the current geographical tag of the display device 1 and the data stored in the display device 1, it is determined whether the system has completed the initialization process of the interactive operations corresponding to the current geographical location before. In addition, it is determined whether the display device 1 has stored the operation scripts and media data complying with the geographical tag or whether the related operation scripts and media data have been updated to the newest version. If the display device 1 has not executed the initialization process before or it is determined that the operation scripts and media data related to the geographical tag need to be obtained or updated, the display device 1 will then download the corresponding operation scripts and media data from the network or server based on the geographical tag. When the data has been downloaded to the display device 1, the initialization process of interaction operations has been completed.

The display device 1 that has not initialized before might have no operation script and media data preloaded. When the display device 1 is set up in the work space and turned on, it will determine whether to acquire the operation scripts and media data corresponding to the geographical tag of current location, Then the display device 1 will request the server to download or acquire via the network the operation script and media data corresponding to the geographical tag. Moreover, the display device 1 which has been initialized might be moved to another location or the operation scripts and media data downloaded and stored previously might be obsolete after periods of time. Thereby, during the initialization process, the display device 1 will check the most updated version of the operation scripts and the media data with the server according to the geographical tag of current location and determine if download or update should be required.

Figure 2:
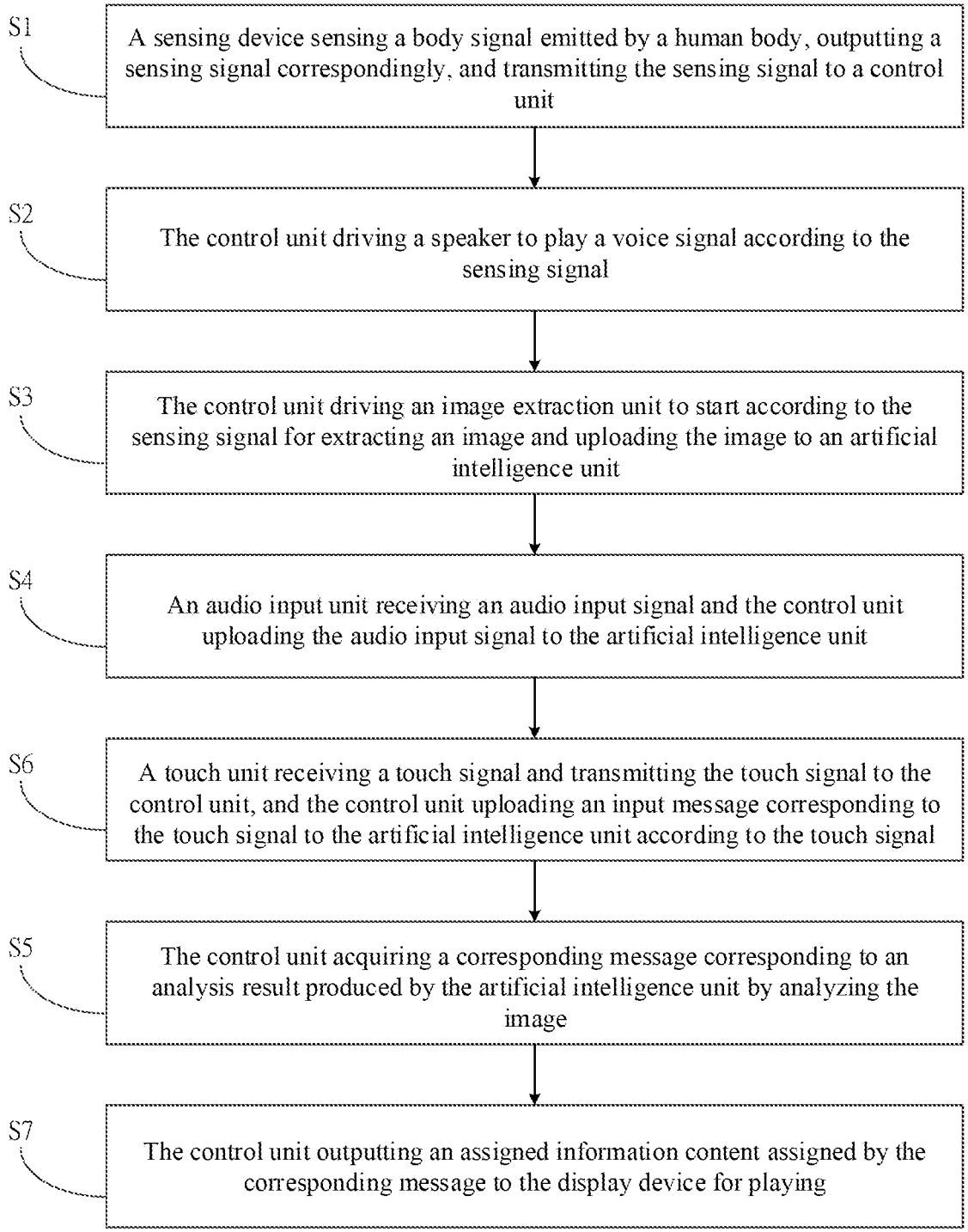
FIG. 2 shows a flowchart of the interactive display method according to an embodiment of the present invention.

Please refer to FIG. 2, which illustrates a flowchart of the interactive display method according to an embodiment of the present invention. As shown in FIG. 2, the interactive display method according to the present invention comprises steps of:

Step S1: A sensing device sensing a body signal from a human body, outputting a sensing signal correspondingly, and transmitting the sensing signal to a control unit;

Step S3: The control unit driving an image capturing unit to start capturing an image according to the sensing signal and uploading the image to an artificial intelligence unit;

Step S5: The control unit obtaining a corresponding message corresponding to an analysis result produced by the artificial intelligence unit after the artificial intelligence unit analyzes the image; and Step S7: The control unit outputting an assigned information content identified in the corresponding message to the display device for playing.

As described in the step S1, according to the embodiment of present invention, the display device 1 is set up in a public area and operation scripts corresponding to the geographical tag of the public area are pre-loaded in the display device 1. When a user approaches the display device 1 within a certain range, the sensing device 2 will sense the signal indicating the proximity of the user, such as the infrared, ultrasonic, gravity, or touch signals from the user's body, and produce a sensing signal correspondingly to the control unit 4. For example, the sensing device 2 may be an infrared sensing electronic device capable of sensing the infrared signal emitted by a human body. By setting the sensing wavelength range to be 8~12 μm, the infrared radiated by a human body, which has central wavelength range 9~10 μm, can be sensed. In addition, the movement of a human or an object can be detected according to the variation in the difference between the sensed infrared and the background temperature. According to an embodiment of the present invention, the sensing device 2 also includes multiple signal receiving units capable of sensing different types of information from the proximate users. After the proximity of the user is detected, the sensing device 2 can sense, for example, the location of the nearby users, the number of nearby users, the height of the users, the shape of the users, the velocities of the moving users, or the moving directions of the users. The output sensing signals also include the information of the proximate users. According to an embodiment of the present invention, after detecting the proximity of a user, the sensing device 2 continues to sense and output theses sensing signals to the control unit 4. After the sensing device 2 senses the human body signal emitted by the proximate human body and outputs the sensing signal correspondingly, such that the sensing signal is transmitted to the control unit 4, namely, the step S1, the method further comprises a following step of:

Step S2: The control unit driving a speaker to play a voice signal according to the sensing signal.

As shown in the step S2, when the control unit 4 receives the sensing signal, it generates a command to play a notification message to the user. For example, the control unit 4 drives the speaker 6 to play a voice message with the content being greetings, such as "Welcome to the XXX museum" corresponding to the geographical tag of the display device or asking the user what service the user needs. According to an embodiment of the present invention, the display device 1 can also display the notification message to notify the user to start interactions. Alternatively, displaying message playing voice message can be performed concurrently.

As shown in the step S3, based on the received sensing signal, the control unit 4 drives the image capturing unit 3 to capture an image of the user and uploads the image to the artificial intelligence unit 5. Next, as shown in the step S5, according to an embodiment of the present invention, after the display device 1 captures the image of the user, the control unit 4 uploads the image information to the artificial intelligence unit 5, which performs calculations and analyses the image information using artificial neural network. According to the embodiment of present invention, the convolutional neural network can be adopted to extract the face of the user in the image information. Thus, the characteristics of the user can be further detected and the analysis results corresponding to the user can be generated and transmitted back to the control unit 4. The analysis results maybe a combination of characteristics, including age, gender, height, posture, facial expression, action. Nonetheless, the present invention is not limited to these characteristics. According to an embodiment of the present invention, the image capturing unit 3 is controlled by the control unit 4 to adjust the parameters for capturing image, such as angle of photographing, focal lengths, resolutions, colors, picture qualities, or duration of time for capturing the image of the user. The control unit 4 can adjust the image capturing parameters according to the sensing signals from the sensing device 2 or the image capturing unit 3, for example, according to the ambient light signal or the first captured image of the user. Thus, the preferable image signals of the user can be obtained.

According to an embodiment of the present invention, as the sensing device 2 detects a user enters the motion detection region A, the step S1 is executed for producing and transmitting sensing signals to the control unit 4. Next, the step S2 is executed. When the control unit 4 receives the sensing signals, it drives the speaker 6 to play the voice message to the user. Afterwards, as shown in the step S3, the control unit 4 drives the image capturing unit 3 to start capturing the image of the current user in response to the received sensing signals. The captured image is then uploaded to the artificial intelligence unit 5 by the control unit 4, so the character analysis of the user will be performed and the analysis result will be generated. For example, the smart interactive display system is set up in a company or a residential district and connects to a database stores the information of the registered users in the area, the user's identity can be identified according to the analysis result of characteristics comparing to the user information in the area, and the smart interactive display device then pops up various notification messages or personal memos corresponding to the user identities. According to the operation scripts and identified characteristics of users, different interactive procedures will be performed and personal information of the identified user can be acquired purposely to perform corresponding interactions or processes subsequently. If a user has set authorization for the smart interactive display device to access personal information beforehand or agrees the smart interactive display device to access personal information on the spot, the smart interactive display device can acquire the personal information of the user for verification, such as fingerprint, voiceprint, iris, password, identification number, or other personal identity information. The smart interactive display device may subsequently permit the user to pass to other areas or authorize the user to utilize specific services or functions.

According to an embodiment of the present invention, if the smart interactive display device is set up in a public area, the artificial intelligence unit 5 or the control unit 4 will not actively identify any user's identity or acquire personal information following the analysis result of any user. Instead, it will only request user's permission to acquire personal information if the identification process is necessary. After the user leaves, the personal information is deleted from the smart interactive display device immediately for protecting the user's privacy, wherein the instructions are included in the corresponding part of the operation scripts.

After the control unit drives the image capturing unit to capture the image of the user in response to the sensing signal and uploads the image to an artificial intelligence unit, namely, the step S3, the method further comprises a step of:

Step S4: An audio input unit receiving an audio input signal and the control unit uploading the audio input signal to the artificial intelligence unit.

As shown in the step S4, the audio input unit 7 receives an audio input signal from the user. The artificial intelligence unit 5 performs calculations and analyses the image and the audio input signal with artificial neural network for acquiring the analysis result, which is transmitted to the control unit 4. The analysis results of the embodiment of the present invention further includes the speaking language of the user, which is determined by analyzing the user's voice input signal. The speaking langue of the user may include, for example, Mandarin, English, Japanese, Korean, or other languages.

According to the embodiment of present invention, the audio input unit 7 receives the voice features of the user and the control unit 4 uploads the received voice features to the artificial intelligence unit 5, which analyzes the characteristics of the user and generates the analysis results. According to the determined speaking language, age, or gender of the user in the analysis result, the corresponding part of the operation scripts and media data can be selected by artificial intelligence unit 5 and included in the corresponding message. For example, the interactive user guides or other media contents corresponding to the speaking language of the user and matching the age, gender or other characteristics of the user are selected to be played.

After the control unit drives the image capturing unit to start capturing the image of the user in response to the sensing signal and uploads the image of the user to the artificial intelligence unit, namely, the step S3, the method further comprises a step of:

Step S6: A touch unit receiving a touch signal and transmitting the touch signal to the control unit, and the control unit uploading an input message corresponding to the touch signal to the artificial intelligence unit according to the touch signal.

As shown in the step S6, the touch control unit 12 receives the touch control signal input by the user and transmits it to the control unit 4. The control unit 4 produces an input message correspondingly in response to the touch control signal and transmits the input message corresponding to the touch control signal to the artificial intelligence unit 5. For example, the user selects an icon of a particular service on the touch screen. The control unit 4 transmits the code representing the selected service as the input message to the artificial intelligence unit 5. The artificial intelligence unit 5 generates the corresponding message M according to the analysis results of the user and the input message corresponding to the touch control signal. The input message transmitted to the artificial intelligence unit 5 in response to the touch control signal includes information of the user input, such as the function selected by the touch control signal, the code representing the service or other item selected by the user, or the content input by the user.

Next in the step S5, after the artificial intelligence unit 5 produces the analysis results according to the image of the user and receives the input message, the control unit 4 acquires the corresponding message M corresponding to the analysis results and the input message.

In the following step S7, the artificial intelligence unit 5 generates the corresponding message M according to the analysis results of the user, which is generated according to the image of the user. The control unit 4 acquires the corresponding message M and outputs the contents identified in the corresponding message M to the display device 1 for playing. The contents identified in the corresponding message M can be selected from the group consisting of text, image, audio, and video. In one embodiment of the present invention, after the artificial intelligence unit 5 acquires the identified contents corresponding to the analysis results of the user, it generates the corresponding message M and transmits to the control unit 4. Alternatively, the corresponding message M can be the command for calling or executing specific function or service, or the link or code to obtain or generate the identified texts, images, audio, or video. The control unit 4 acquires or generates the identified contents according to the command, link, or code in the corresponding message M and outputs the identified contents to the display device 1 for playing. For example, when the analysis results of the user describe that the user is a child, the contents identified in the corresponding message M can be guide information in child, cartoon, animation or comic version. Alternatively, when the analysis results show that the user speaks English, the identified contents can be guide information in English version. When the smart interactive display device is set up in a commercial property, such as a hospital or a hotel, and the analysis results show that the user speaks Taiwanese, the first identified contents can include greeting voice messages, which ask if the user needs to register, check in, or request for any information in Taiwanese. The display device 1 also displays visual greeting messages on the user interface 11. Afterwards, the user can select the desired function or service manually via the touch panel 12. In addition, the user can input the keyword to request a service or search any related item via the touch control unit 12 of the display device 1. When a user selects an item, such as registration or check-in, the process flow is provided corresponding to the characteristics of the user. Alternatively, when a user selects to search for information, for example, medical knowledge or tour guide, a particular version of information corresponding to the characteristics of the user and the type of information requested by the user is searched and provided to the user.

According to an embodiment of the present invention, the smart interactive display system can request the user's permission to verify personal identity, which grants the user authorization to utilize specific services. The procedures of the specific services, for example, hospital registration or hotel check-in, cannot be called until the personal identity of the user is verified. According to an embodiment of the present invention, after the smart interactive display system confirms the service required by the user, the smart interactive display system can provide applicable price plans, such as by hour, by time of use, or by month, and various payment methods for the user's selection. The artificial intelligence unit 5 can search and obtain the statistics according to the identity provided by the user, such as the user's recent preferences, and provide recommendations of services, merchandises, areas, or functions suitable to the user's preferences based on the analysis of the statistics corresponding to the user.

Figure 3A:
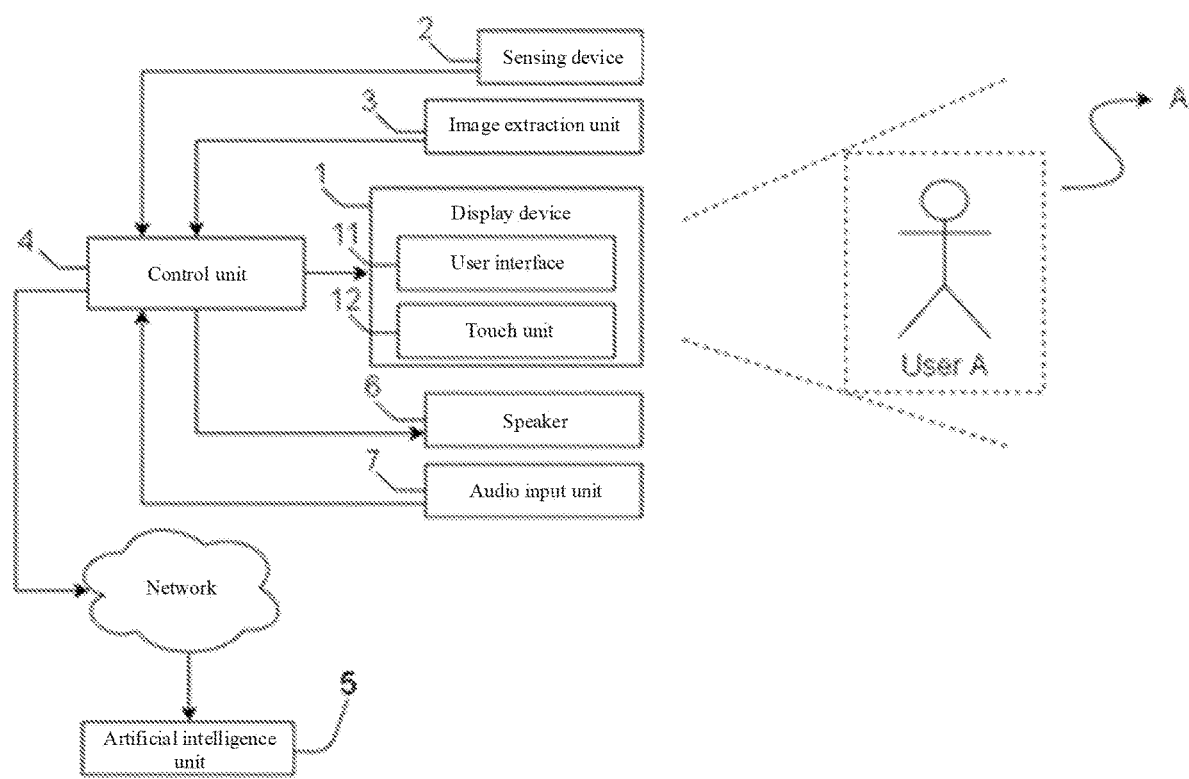
FIG. 3A shows a schematic diagram of the interactive display method according to the first embodiment of the present invention.
Figure 3B:
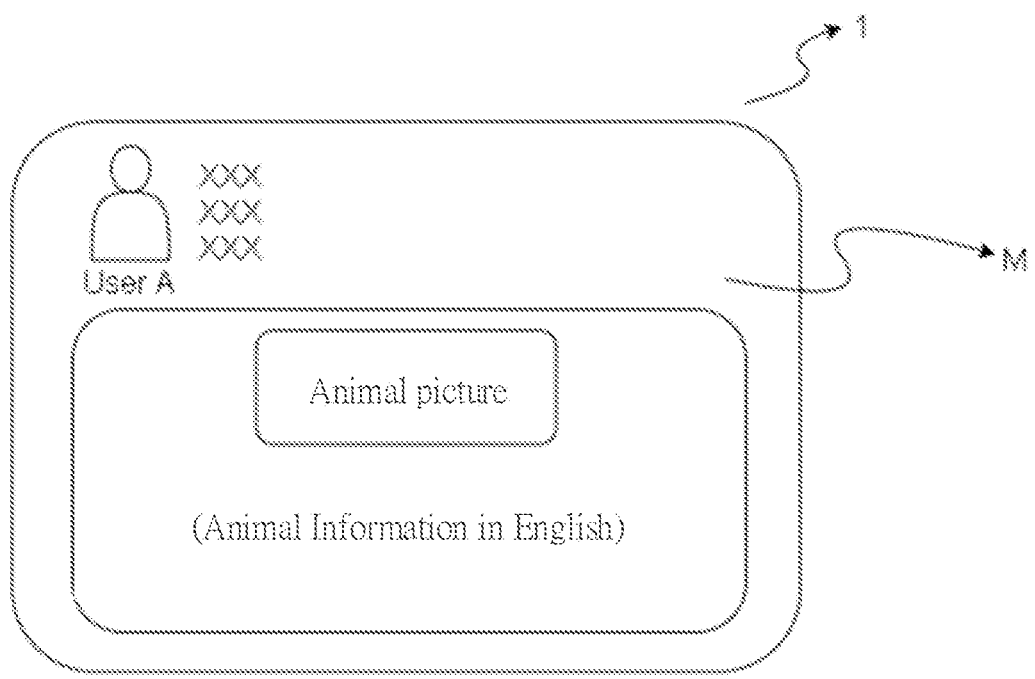
FIG. 3B shows a schematic diagram of the interactive display method according to the first embodiment of the present invention.

Please refer to FIG. 3A and FIG. 3B, wherein the FIG. 3A shows the schematic diagrams of the interactive display system and FIG. 3B shows an exemplary user interface according to an embodiment of the present invention. An exemplary smart interactive display system in one embodiment of present invention corresponds to a zoo. The smart interactive display device is set up in the areas of the zoo or the intersection locations of traffic flows respectively, and the operation scripts corresponding to the geographical tags are pre-loaded in the smart interactive display devices. When the detector of a smart interactive display system detects a user enters the motion detection region, for instance, in the tiger area, the control unit 4 of the smart interactive display device corresponding to the area, in response to the detection signal, drives the speaker 6 in the area to play voice message which notifies the user to respond and interact with the smart interactive display device. Various voice messages can be played, for example, including: "Hello, welcome to the XX region of the XX zoo. Do you need guidance?" according to part of the operation scripts. The control unit 4 also drives the image capturing unit 3 and the audio input unit 7, in response to the detection signal, to capture the image and voice features of the current user. Then the control unit 4 uploads the captured data to the artificial intelligence unit 5 which performs characteristic analysis of the current user and generates the analysis result. The control unit 4 acquires the corresponding message M, which is generated based on the analysis result, and the smart interactive display device provides the contents identified by the corresponding message M to the user. For example, if the analysis result determines that the current user UserA is male, speaking English and about 10 years old, the corresponding message M can identify contents for kids, such as English animation guide. The users may be at different ages, have different genders, and speak any languages, and the analysis results generated by the artificial intelligence unit 5 can determine these characteristics of the current user correspondingly. The control unit 4 acquires the corresponding message M complying with the analysis results of the current users and provides different versions of guidance with contents suitable to different users respectively. According to an embodiment of the present invention, the stand or screen height of the smart interactive display device can be adjusted automatically so that content is displayed at the height suitable to the current user, wherein the instructions are included in the operation scripts, for example, the animation guidance is played on the display screen which is adjusted to lower position suitable to teenagers or children. The control unit 4 can also automatically adjust the settings of the image capturing unit 3 or the audio input unit 7 according to the operations scripts, such the image capturing angle, the image capturing focal length, or background noise removal from audio inputs, for acquiring the user message with better quality, and thus the artificial intelligence unit 5 can analyze the characteristics of the users more accurately. According to an embodiment of the present invention, the smart interactive display system controls other service devices in the area or delivers the user requests to the central management center which controls other service devices in the area, for providing the requested services to the users who request for the services. For example, a tour-guide robot, which is most boys' favorite, is controlled and sent to suitable young users for providing tour guide easy to understand, wherein the instructions are included in the operation scripts. In addition, if the user is determined as an adult, the tour guide provided to the user can include the introductions of pay items, such as charged services or merchandize, in the area according to the operation scripts.

Figure 4A:
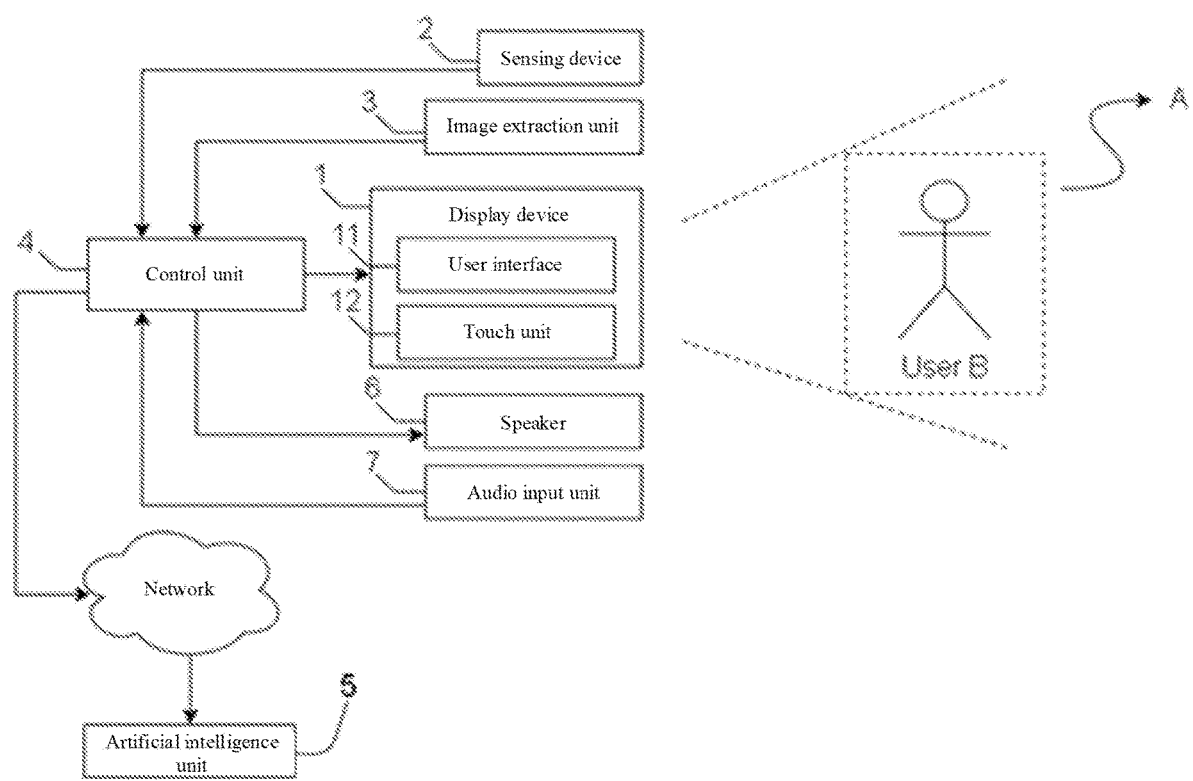
FIG. 4A shows a schematic diagram of the interactive display method according to the second embodiment of the present invention.
Figure 4B:
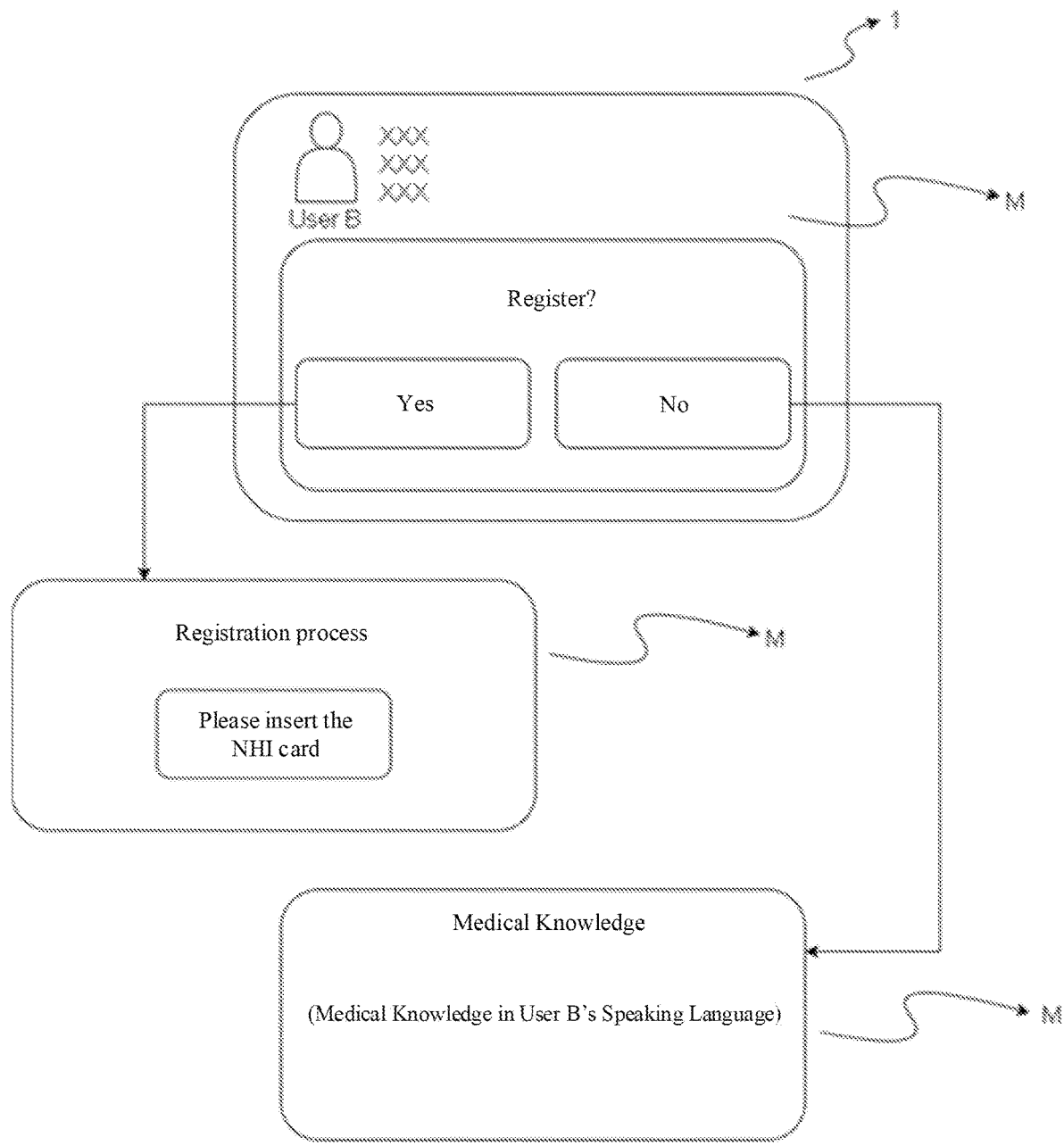
FIG. 4B shows a schematic diagram of the interactive display method according to the second embodiment of the present invention.

Please refer to FIG. 4A and FIG. 4B, wherein the FIG. 4A shows the schematic diagrams of the interactive display system and FIG. 4B shows an exemplary user interface according to an embodiment of the present invention. An exemplary smart interactive display system in one embodiment of present invention corresponds to a hospital or medical center. The smart interactive display devices of the smart interactive display system are set up at the entrance, the registration hall, or other traffic nodes of the hospital or medical center, and the operation scripts corresponding to the geographical tags are pre-loaded in the smart interactive display devices. After the smart interactive display devices are turned on, the detectors of the smart interactive display system detect whether any user enters the motion detection regions of any smart interactive display devices. When a detector of the smart interactive display system detects a user enters the motion detection region of a particular smart interactive display device, the control unit 4 of the smart interactive display device drives the speaker 6 in the area to play voice message, in response to the detection signal, which notifies the user to respond and interact with the smart interactive display device. For example, the voice message includes greetings and asking the name of the incoming user in multiple languages according to the operation scripts. The control unit 4 also drives the image capturing unit 3 and the audio input unit 7, in response to the detection signal, to capture the image and voice features of the user. Then the control unit 4 uploads the captured data to the artificial intelligence unit 5 which performs characteristic analysis of the user and generates the analysis result. Afterward, the smart interactive display system acquires the corresponding message M, which is generated based on the analysis result. For example, if the analysis result shows that the current user UserB is determined as female, speaking Taiwanese, and at the age around 40 years old, the control unit 4 acquires the corresponding message M complying with these characteristics and plays the identified contents to the current user UserB according to corresponding part of the operation scripts. A voice message is played by the speaker, for instance, which asks the current user in Taiwanese if she needs to register with a doctor and the inquiry message and response options are displayed by the display device 1 at the same time. The current user can decide whether to register and select the corresponding option via the touch control unit 12. If the current user decides to register with certain doctor, the control unit 4 plays the subsequent corresponding messages according to the operation scripts and the selected option. For example, the control unit 4 controls the speaker to play the voice messages in Taiwanese, including: asking the current user to insert the National Health Insurance (NHI) card or other applicable identity card introducing in detail the adult registration procedure for medical consultation, asking the current user which department should be registered for medical consultation, or asking symptoms of the patient for recommending the relevant department. If the current user does not want to register with doctor, the control unit 4 plays the subsequent corresponding message according to the operation scripts and the selected option. For example, the control unit 4 controls speaker to play the voice messages in Taiwanese or other local language spoken by the user, which asks the user whether the user wants to see some medical knowledge or news, footage of recent epidemics, or the map of the public areas in the hospital, or check whether the user wants to visit a hospitalized patient.

Figure 5A:
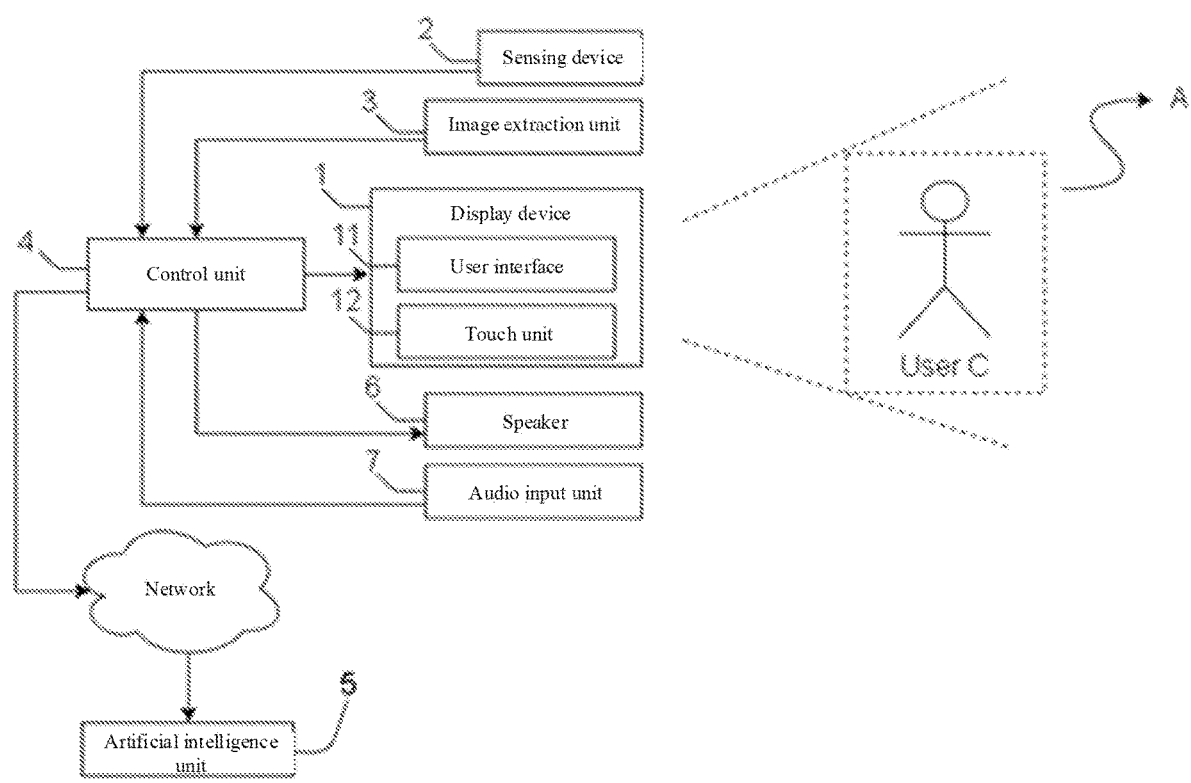
FIG. 5A shows a schematic diagram of the interactive display method according to the third embodiment of the present invention.
Figure 5B:
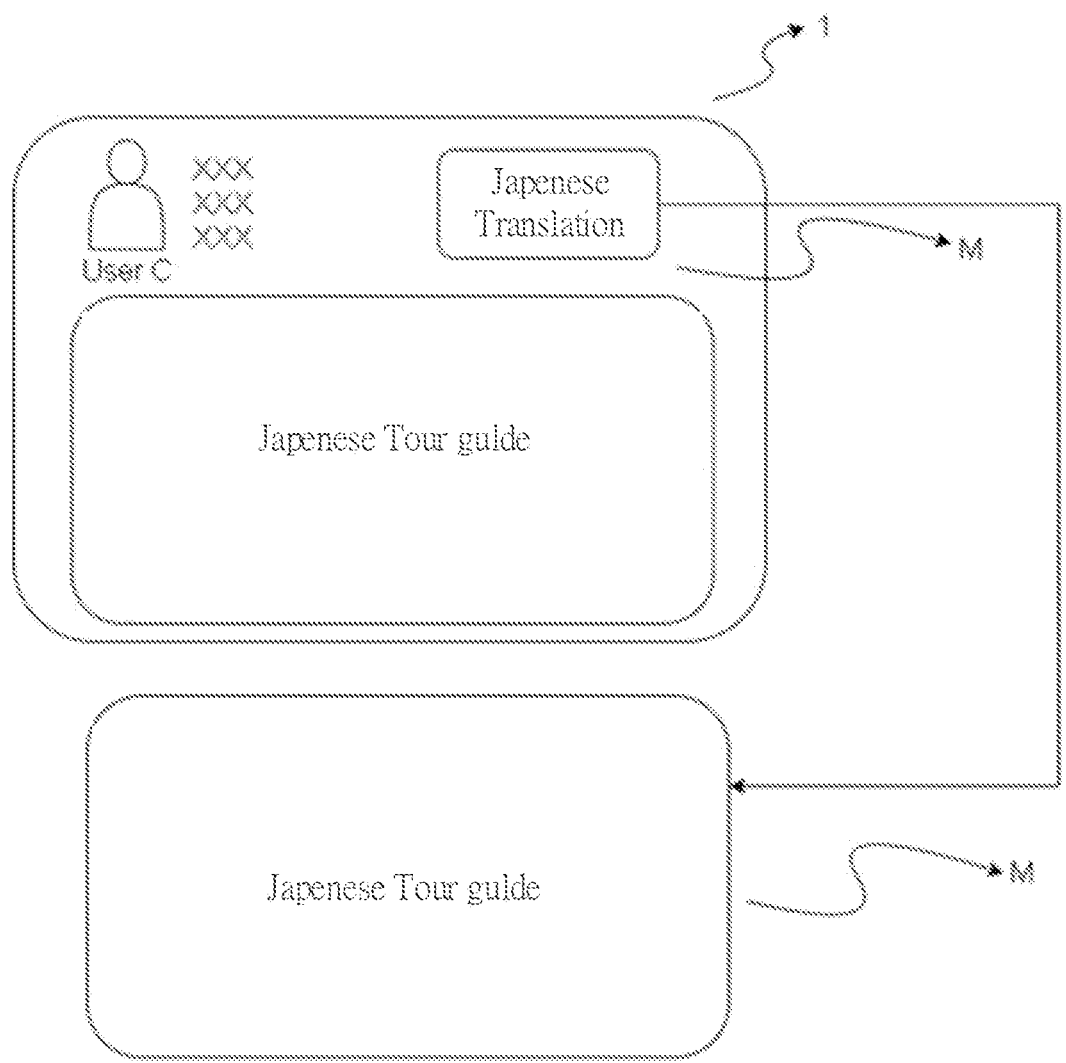
FIG. 5B shows a schematic diagram of the interactive display method according to the third embodiment of the present invention.

Please refer to FIG. 5A and FIG. 5B, wherein the FIG. 5A shows the schematic diagrams of the interactive display system and FIG. 5B shows an exemplary user interface according to an embodiment of the present invention. An exemplary smart interactive display system according to one embodiment corresponds to an interchange station. The smart interactive display devices are set up at the hall or the entrance of the interchange station, and the operation scripts corresponding to the geographical tags are pre-loaded in the smart interactive display devices. After the smart interactive display devices are turned on, the detectors of the smart interactive display system detect whether any user enters the motion detection regions of any smart interactive display devices. When a detector of the smart interactive display system detects a user enters the motion detection region of a particular smart interactive display device, the control unit 4 of the smart interactive display device drives the image capturing unit 3 and the audio input unit 7, in response to the detection signal, to capture the image and voice features of the user. Then the control unit 4 uploads the captured data to the artificial intelligence unit 5 which performs characteristic analysis of the user and generates the analysis result. Afterward, the smart interactive display system acquires the corresponding message M, which is generated based on the analysis result. For example, if the analysis result shows that the third user UserC is male, speaking Japanese, and at the age around 25 years old, the control unit 4 acquires the corresponding message M complying with these characteristics and plays the identified contents to the third user UserC according to the corresponding part of the operation scripts. The corresponding message, for instance, can includes a Japanese voice message which asks the user whether he needs to book a transportation ticket, receive map and guide information inside and outside the transfer station, information of public transportation nodes and sightseeing spots in the city, commercials which may attract attentions of men, or any other information. The inquiry message is also outputted to the display device 1 to be displayed according to the operation scripts. If the third user requests for information of a certain transportation node via the touch control unit 12 or speaks such request in Japanese to the audio input unit 7, the artificial intelligence unit 5 will process and analyze the input message received from the user. The artificial intelligence unit 5 will produce or obtain the corresponding message M which complies with the analysis result, and return the corresponding message M to the control unit 4, such that the identified contents will be displayed on the display device 1 of the smart interactive device in response to the input message. For example, the smart interactive display device will provide the ways to reach the certain transportation node specified by the user in Japanese as well as the information of the sightseeing spots and touring guides around the certain transportation node specified by the user. In addition, the smart interactive display device displays or plays message to inquire the user whether to book a ticket in order to travel to the transportation node specified by the user and initializes the ticket booking process if the user approves.

Figure 6A:
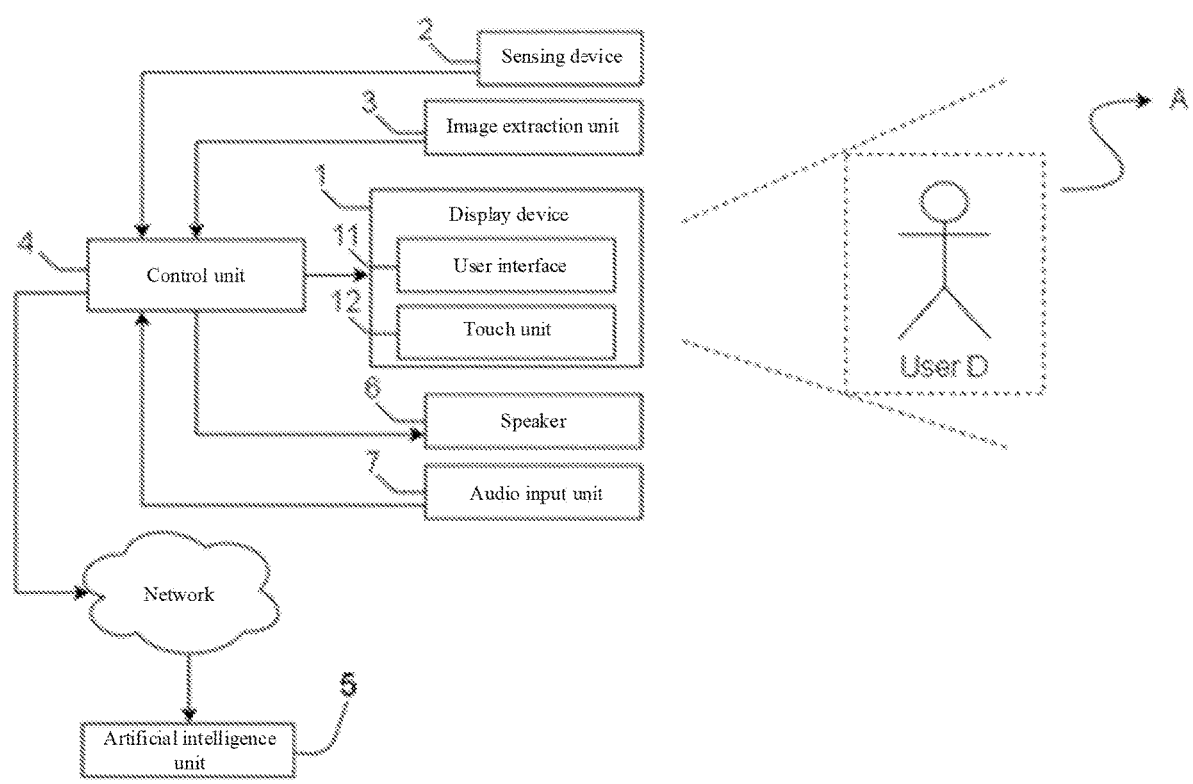
FIG. 6A shows a schematic diagram of the interactive display method according to the fourth embodiment of the present invention.
Figure 6B:
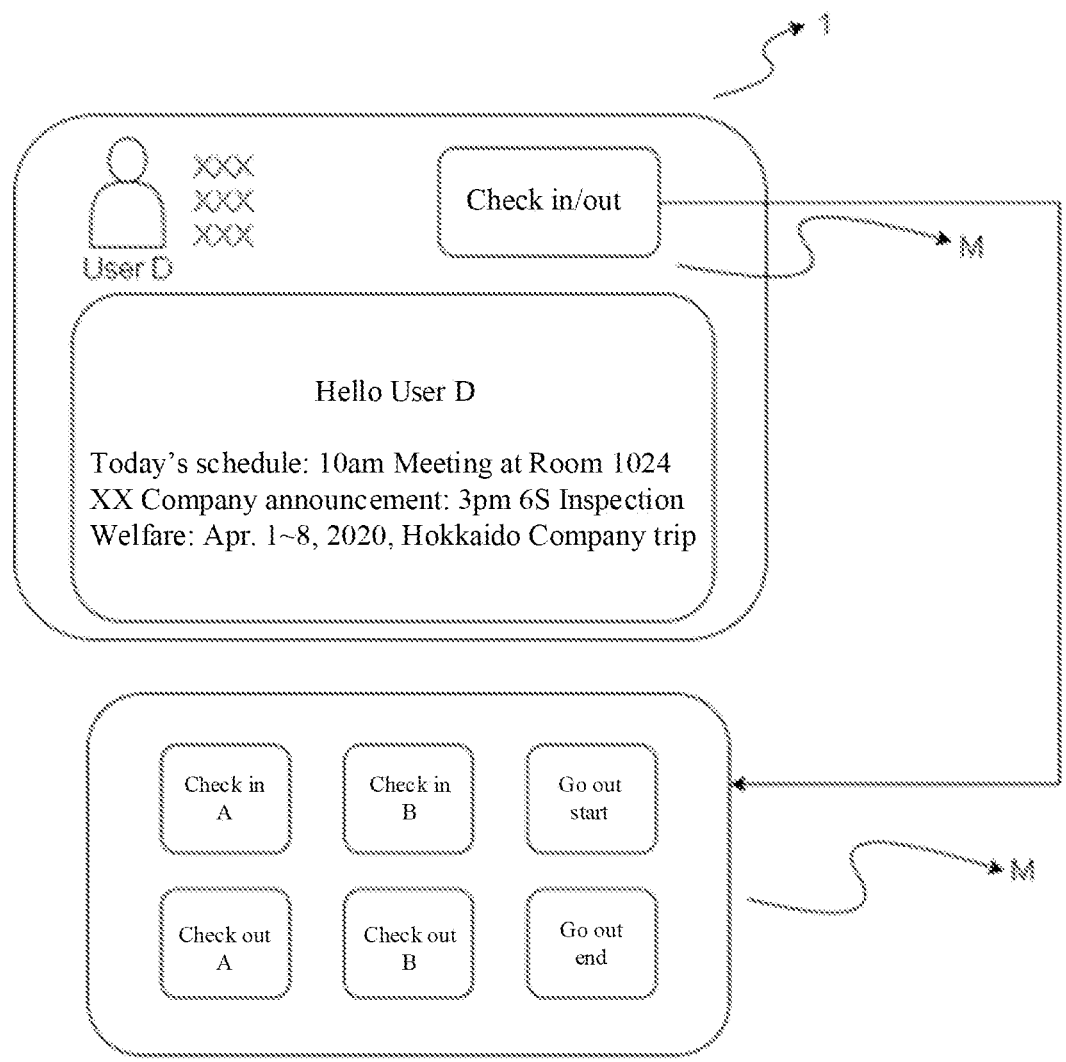
FIG. 6B shows a schematic diagram of the interactive display method according to the fourth embodiment of the present invention.

Please refer to FIG. 6A and FIG. 6B, wherein the FIG. 6A shows the schematic diagrams of the interactive display system and FIG. 6B shows an exemplary user interface according to an embodiment of the present invention. An exemplary smart interactive display system according to one embodiment corresponds to a corporation or company. For example, the smart interactive display device is set up at the entrance of a company building and the smart interactive display system connects to the access control system of the company building. The operation scripts corresponding to the geographical tags are pre-loaded in the smart interactive display devices. When a detector of the smart interactive display system detects a user enters the motion detection region of a particular smart interactive display device, the control unit 4 of the smart interactive display device drives the image capturing unit 3 and the audio input unit 7, in response to the detection signal, to capture the image and voice features of the user. Then the control unit 4 uploads the captured data to the artificial intelligence unit 5 which performs characteristic analysis of the user and generates the analysis result. The analysis result of the current user will be compared to the data of registered users in the database. If the characteristics in the analysis result of the current user match with the identification data of a registered user, for example, the age, height, facial features, voiceprint, and other biometric features of the current user comply with the registered identification data of a fourth user UserD, the current user can be confirmed as an employee of the company. Then a corresponding message M is generated according to the analysis result and the control unit 4 acquires the corresponding message M. The corresponding message M in response to the analysis result of the current user may identify the contents including todays' memo of the current user, related announcements of the company, employee welfare information, the options of employee clocking in or out, the access control records of the employee and other information related to the current user. The identified contents are output to the display device 1 to be displayed, such that the user can see and select the desired item. In contrast, if the characteristics in the analysis result of the current user cannot match the identification data of any registered user, the smart interactive display device will play message asking the current user to provide fingerprint or identification certificate, or other information to register as a visitor according to the operation scripts. Otherwise, the smart interactive display device returns to the initial status and the current user is not authorized to access the company building.

According to an embodiment of the present invention, the interactive display device also collects the real-time information, such as facial expression, body motion, and tone of voice, from the current user, and uploads the real-time information to the artificial intelligence unit 5. The artificial intelligence unit 5 generates real-time chat messages with interactive contents according to the received personal information, such as user's recent preferences collected based on the identity provided by the current user, and the real-time information collected from the current user. The real-time chat messages are returned to the smart interactive display device 1 for playing to the current user. Thereby, the smart interactive display device can provide real-time chat capabilities with the users.

According to an embodiment of the present invention, the artificial intelligence unit 5 generates real-time chat messages with interactive contents according to the geographical tag indicating the location of the smart interactive display device, the personal information of the current user or the real-time information collected from the current user. Alternatively, multiple chat options can be generated based on the information and provided in the interactive chat message played to the current user for further selection. After the current user makes selection, the smart interactive display device, according to the operation scripts, plays the interactive content and message corresponding to the chat option selected by the current user.

According to an embodiment of the present invention, the smart interactive display system can work in coordination with the personal mobile devices of the users. The smart interactive display device can produce and display links to the content information or two-dimensional barcodes of the content information or application programs. The user can operate the personal mobile device to scan the two-dimensional barcode displayed on the smart interactive display device and the personal mobile device will retrieve the content information or application program. In addition, the smart interactive display device can display information of local wireless network node according to the operation scripts, including the account and password, and the user can operate his personal mobile device to connect the wireless network in the area. Alternatively, the smart interactive display device has peer-to-peer connection capability and the content information or application program can be provided to the personal mobile device via peer-to-peer connection. With the mobile personal device connecting the smart interactive display system, the user can perform more interactions via the application program. For example, when a user is waiting for the process of his requested service, such as the internal operations of registration with doctor or hotel check in, the smart interactive display system can provide mini games or other entertainment contents to the personal mobile device of the user according to the operation scripts. After completion of the process, the smart interactive display system transmits a notice to the personal mobile device to notify the user according to the operation scripts. Thereby, the user needs not to wait in front of the smart interactive display device until the process is completed.

In summary, the present invention discloses a smart interactive display system. The control unit of the smart interactive display system connects to the display device, the sensing device, and the image capturing unit or other visual or acoustic information capturing unit. The captured user information is uploaded to the artificial intelligence unit which determines the characteristics of the current user, including analyzing the speaking language, the gender, and the age. The corresponding message is generated according to the analysis result of the characteristics and provided to the display device for playing to the current user. Thereby, the interactions with the smart interactive display device can be more user-friendly to users.

What is claimed is:

1. An interactive display method in an interactive display system, applied for a display device pre-storing a geographical tag indicated to a geographical location, comprising steps of:
    establishing a sensing device having a proximity sensor for sensing a human body of a user, generating a corresponding sensing signal, and transmitting said corresponding sensing signal to a control circuit when said sensing device determines said user is a human;
    driving an image capturing sensor by said control circuit to start capturing an image of said human body according to the corresponding sensing signal and uploading said captured image to a remote artificial intelligence processor via a network, said artificial intelligence processor operating with a neural network, and uploading an audio input signal to said remote artificial intelligence processor via said network, wherein said audio input signal from said user is received by said audio input device and inputted to said control circuit;
    obtaining a corresponding message, received by said control circuit while said display device is located at said geographical location indicated by the geographical tag, corresponding to analysis results produced by said remote artificial intelligence processor, wherein said remote artificial intelligence processor generates said analysis results according to said image and said audio input signal, said analysis results comprising characteristics and a speaking language of said user; and
    obtaining an assigned information content, based upon a plurality of characteristics of the user, received by said control circuit, identified in said corresponding message and transmitting said assigned information content to said display device for playing said assigned information content, wherein said display device stores operation scripts corresponding to the geographical tag, and a part of the operation scripts is selected and contained in said corresponding message while said display device is located at said geographical location indicated by the geographical tag, said display device permits the user to pass to another area or authorizes the user to utilize a local service at said geographical location.

2. The interactive display method of claim 1, wherein said remote artificial intelligence processor determines said assigned information content according to said analysis results, generates said corresponding message which identifies said assigned information content, and transmits said corresponding message to said control circuit.

3. The interactive display method of claim 1, wherein said corresponding message includes said assigned information content.

4. The interactive display method of claim 1, wherein said control circuit acquires said assigned information content according to said corresponding message and transmits said assigned information content to said display device for playing said assigned information content.

5. The interactive display method of claim 1, further comprising a step of:
    said control circuit driving a speaker to play a voice message in response to said corresponding sensing signal.

6. The interactive display method of claim 1, wherein said analysis results further include an estimated age and an estimated gender.

7. The interactive display method of claim 1, further comprising a step of:
    a touch control circuit receiving a touch control signal and transmitting said touch signal to said control circuit, where said control circuit generates an input message in response to said touch signal and uploads the input message to said remote artificial intelligence processor.

8. The interactive display method of claim 1, further comprising a step of:
    issuing the geographical tag to the display device, wherein the geographical tag is corresponding to a current location of the display device; and
    determining whether the operation scripts stored in the display device are corresponding to the geographical tag.

9. A smart interactive display device, comprising:
    a display unit; and
    a control circuit, which is connected electrically to said display unit, connected to a remote artificial intelligence processor via a network, said artificial intelligence processor operating with a neural network;
    wherein a geographical tag indicated to a location of said display unit and operation scripts corresponding to the geographical tag are stored in said smart interactive display device,
    wherein said control circuit is connected electrically to a sensing device, an audio input device and an image capturing sensor, said sensing device having a proximity sensor and senses a body signal of a human body of a user and outputs a corresponding sensing signal to said control circuit when said sensing device determines said user is a human, and said control circuit drives said image capturing sensor to capture an image of the human body and said audio input device receiving an audio input signal of said user in response to the corresponding sensing signal and uploads said image and said audio input signal to said remote artificial intelligence processor via said network, said remote artificial intelligence processor analyzes said image and said audio input signal to generate analysis results and a corresponding message according to said analysis results, said analysis results comprising characteristics and a speaking language of said user, and
    wherein said control circuit acquires said corresponding message from said remote artificial intelligence processor via said network while said display device is located at said geographical location indicated by the geographical tag, said corresponding message is generated by said remote artificial intelligence processor according to said analysis results of said image and said audio input signal, said control circuit outputs an assigned information content, based upon a plurality of characteristics of the user, identified by said corresponding message to said display unit for playing said assigned information content, and a part of the operation scripts is selected contained in said corresponding message while said display device is located at said geographical location indicated by the geographical tag, said display device permits the user to pass to another area or authorizes the user to utilize a local service at said geographical location.

10. The smart interactive display device of claim 9, wherein said display unit includes a touch control circuit and a user interface associated with the touch control circuit.

11. The smart interactive display device of claim 9, and further comprising:
a speaker, connected electrically to said control circuit for playing a voice message.

12. The smart interactive display device of claim 9, wherein said smart interactive display device receives the geographical tag corresponding to a current location of said smart interactive display device.

13. The smart interactive display device of claim 9, wherein said smart interactive display device receives the operation scripts corresponding to the geographical tag.

14. A smart interactive display system, comprising:
a sensing device having a proximity sensor;
a display device stores a geographical tag and operation scripts corresponding to the geographical tag while said display device located at a geographical location indicated by the geographical tag;
an image capturing sensor;
an audio input device; and
a control circuit, electrically connected to said sensing device, connected to a remote artificial intelligence processor via a network, said artificial intelligence processor operating with a neural network, said display device, said audio input device and said image capturing sensor;
wherein said sensing device senses a body signal of a human body of a user and outputs a corresponding sensing signal to said control circuit, and said control circuit drives said image capturing sensor to capture an image of the said human body and said audio input device receiving an audio input signal of said user in response to the corresponding sensing signal and uploads said image and said audio input signal to said remote artificial intelligence processor, said remote artificial intelligence processor analyzes said image and said audio input signal to generate analysis results, said remote artificial intelligence processor generates a corresponding message according to said analysis results, said analysis results comprising characteristics and a speaking language of said user, and
wherein said control circuit acquires a corresponding message from said remote artificial intelligence processor while said display device is located at said geographical location indicated by the geographical tag said corresponding message is generated by said remote artificial intelligence processor according to said analysis results of said image and said audio input signal, said control circuit outputs an assigned information content, based upon a plurality of characteristics of the user, identified by said corresponding message to said display device for playing said assigned information content, and a part of the operation scripts is selected and contained in said corresponding message while said display device is located at said geographical location indicated by the geographical tag, said display device permits the user to pass to another area or authorizes the user to utilize a local service at said geographical location.

15. The smart interactive display system of claim 14, wherein said display device includes a touch control circuit and a user interface associated with the touch control circuit.

16. The smart interactive display system of claim 14, and further comprising:
a speaker, connected electrically to said control circuit for playing a voice message.

17. The smart interactive display device of claim 14, wherein the display device receives the geographical tag corresponding to a current location of the display device.

18. The smart interactive display device of claim 14, wherein the display device receives the operation scripts corresponding to the geographical tag.

* * * * *